(12) United States Patent
Kang (10) Patent No.: US 9,158,894 B2
(45) Date of Patent: Oct. 13, 2015

(54) APPARATUS AND METHOD FOR ANALYZING RULE-BASED SECURITY EVENT ASSOCIATION

(71) Applicant: ELECTRONICS AND TELECOMMUNICATIONS RESEARCH INSTITUTE, Daejeon (KR)

(72) Inventor: Dong Ho Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 153 days.

(21) Appl. No.: 13/714,362

(22) Filed: Dec. 13, 2012

(65) Prior Publication Data

US 2013/0160074 A1  Jun. 20, 2013

(30) Foreign Application Priority Data

Dec. 16, 2011 (KR) ........................ 10-2011-0136122

(51) Int. Cl.
*G06F 17/00* (2006.01)
*H04L 29/06* (2006.01)
*G06F 21/00* (2013.01)
*G06F 21/55* (2013.01)

(52) U.S. Cl.
CPC .............. *G06F 21/00* (2013.01); *G06F 21/554* (2013.01)

(58) Field of Classification Search
CPC ........ G06F 21/554; G06F 21/00; G06F 21/55
USPC ............................................................. 726/1
See application file for complete search history.

(56) References Cited

U.S. PATENT DOCUMENTS

| 6,405,318 | B1 * | 6/2002 | Rowland ........................ 726/22 |
| 7,673,335 | B1 * | 3/2010 | Chakravarty et al. ........... 726/11 |
| 2004/0263315 | A1 | 12/2004 | Kim et al. |
| 2006/0259968 | A1 | 11/2006 | Nakakoji et al. |
| 2007/0198413 | A1 * | 8/2007 | Nagao ............................ 705/50 |
| 2012/0030123 | A1 * | 2/2012 | Ocko ............................ 705/304 |
| 2013/0040657 | A1 * | 2/2013 | Jackson ..................... 455/456.1 |
| 2014/0165140 | A1 * | 6/2014 | Singla et al. ...................... 726/1 |

FOREIGN PATENT DOCUMENTS

| JP | 2006-319633 A | 11/2006 |
| KR | 10-0419957 B1 | 2/2004 |
| KR | 10-0656352 B1 | 12/2006 |
| KR | 10-2008-0047826 A | 5/2008 |
| KR | 10-2009-0084263 A | 8/2009 |
| KR | 10-2011-0037578 A | 4/2011 |
| KR | 10-2011-0101436 A | 9/2011 |

* cited by examiner

*Primary Examiner* — Andrew Nalven
*Assistant Examiner* — Khang Do (57) ABSTRACT

An apparatus for analyzing rule-based security event association includes a rule management unit to check whether an security event is a candidate security event requiring association analysis, and an event management unit to analyze the candidate security event and check whether the analyzed security event is the candidate security event requiring association analysis. An association processing unit analyzes whether an association event of a rule DB corresponding to a user ID of the candidate security event is matched with a user event list to generate an association analysis result.

15 Claims, 8 Drawing Sheets

| EVENT TYPE | | ACCESS CONTROL SYSTEM | IMAGE ANALYSIS SYSTEM | REAL-TIME POSITION TRACK SYSTEM |
|---|---|---|---|---|
| WHO | object_type | device_id | device_id | device_id |
| | object_id | Evt_id | Evt_id | Evt_id |
| | evt_id | USR_ID | Null | USR_ID |
| | user_id | | | |
| WHEN | time | time | time | time |
| WHERE | pos_x | Null | Null | X |
| | pos_y | Null | Null | Y |
| | pos_z | Null | Null | Z |
| | pos_lat | Null | Null | Lat |
| | pos_lon | Null | Null | Lon |
| | pos_ele | Null | Null | ele |
| | flr_id | BUILDING | BUILDING | BUILDING |
| | bid_id | FLOOR | FLOOR | FLOOR |
| | rom_id | ROOM NUMBER | ROOM NUMBER | ROOM NUMBER |
| WHAT | dst_id | Null | Null | zone name |
| | alert_id | alert_id (S/F) | alert_id | alert_id (S/F) |
| | action | code(I/O) | Null | code(I/O) |
| | severity | Null | Null | ALARM LEVEL |
| HOW | protocol | Null | Null | Null |
| | src_ip | Null | Null | Null |
| | src_port | Null | Null | Null |
| | dst_ip | Null | Null | Null |
| | dst_port | Null | Null | Null |

PHYSICAL SECURITY EQUIPMENT

FIG. 2B

| EVENT TYPE | | IT SECURITY EQUIPMENT | | | | | | | | |
|---|---|---|---|---|---|---|---|---|---|---|
| | | DB MONITOR SYSTEM | INFORMATION LEAKAGE DETECTION SYSTEM | SYSTEM EVENT MONITOR | ANTI-VIRUS | HOST FIRE WALL | VPN | ESM | NETWORK FIRE WALL | INTRUSION PREVENTION SYSTEM |
| WHO | object_type | device_id | device_id | device_id | device_id | DEVICE_ID | device_id | device_id | device_id | device_id |
| | object_id | Evt_id | Evt_id | Evt_id | Evt_id | Evt_id | Evt_id | Evt_id | Evt_id | Evt_id |
| | evt_id | Null | Null | Null | Null | Null | Null | Null | Null | Null |
| WHEN | user_id | time | time | time | time | time | time | time | time | time |
| | time | Null | Null | Null | Null | Null | Null | Null | Null | Null |
| | pos_x | Null | Null | Null | Null | Null | Null | Null | Null | Null |
| | pos_y | Null | Null | Null | Null | Null | Null | Null | Null | Null |
| | pos_z | Null | Null | Null | Null | Null | Null | Null | Null | Null |
| | pos_lat | Null | Null | Null | Null | Null | Null | Null | Null | Null |
| | pos_lon | Null | Null | Null | Null | Null | Null | Null | Null | Null |
| WHERE | pos_ele | BUILDING | BUILDING | BUILDING | BUILDING | BUILDING | BUILDING | BUILDING | BUILDING | BUILDING |
| | flr_id | FLOOR | FLOOR | FLOOR | FLOOR | FLOOR | FLOOR | FLOOR | FLOOR | FLOOR |
| | bld_id | ROOM NUMBER | ROOM NUMBER | ROOM NUMBER | ROOM NUMBER | ROOM NUMBER | ROOM NUMBER | ROOM NUMBER | ROOM NUMBER | ROOM NUMBER |
| | rom_id | table_name | file_name | hostip | Null | Null | Null | Null | Null | Null |
| WHAT | dst_id | alert_id | alert_id | alert_id (S/F) | alert_id | alert_id | alert_id (S/F) | alert_id | alert_id | alert_id |
| | alert_id | Null | Null | code | code | code | code | code | code | code |
| | action | ALARM LEVEL | ALARM LEVEL | Null | ALARM LEVEL | ALARM LEVEL | Null | ALARM LEVEL | ALARM LEVEL | ALARM LEVEL |
| | severity | Null | Null | Null | Null | protocol | Null | PROTOCOL | PROTOCOL | PROTOCOL |
| HOW | protocol | Null | Null | Null | Null | SRC_IP | Null | SRC_IP | SRC_IP | SRC_IP |
| | src_ip | Null | Null | Null | Null | SRC_Port | Null | SRC_PORT | SRC_PORT | SRC_PORT |
| | src_port | Null | Null | Null | Null | DST_IP | Null | DST_IP | DST_IP | DST_IP |
| | dst_ip | Null | Null | Null | Null | DST_Port | Null | DST_PORT | DST_PORT | DST_PORT |
| | dst_port | | | | | | | | | |

FIG.3

<USER INFORMATION TABLE>

| CONTENTS | TYPE | DESCRIPTION |
|---|---|---|
| USR_ID | NUMBER(16) | USER ID |
| USR_NUMBER | NUMBER(8) | EMPLOYEE ID NUMBER |
| USR_NAME | VARCHAR2(10) | USER NUMBER |
| LAB_ID | NUMBER(8) | LAB NUMBER |
| DIVISION_ID | NUMBER(8) | DIVISION NUMBER |
| TEAM_ID | NUMBER(8) | TEAM NUMBER |

FIG.4

<SYSTEM ASSET TABLE>

| CONTENTS | TYPE | DESCRIPTION |
|---|---|---|
| ASSET_ID | NUMBER(16) | ASSET ID |
| ASSET_NAME | VARCHAR2(20) | ASSET NAME |
| ASSET_IP | VARCHAR2(16) | IP ADDRESS |
| USR_ID | VARCHAR2(20) | ASSET MAC ADDRESS |
| DIVISION_ID | NUMBER(16) | USER ID OF ASSET |
| DESC | VARCHAR2(20) | DESCRIPTION ON ASSET |
| BLD_ID | NUMBER(6) | ASSET POSITION - BUILDING ID |
| FLR_ID | NUMBER(4) | ASSET POSITION - BUILDING FLOOR |
| ROM_ID | NUMBER(10) | ASSET POSITION - ROOM UNIQUE INDEX |

FIG.5

| LIST NUMBER | RULE ID | SECURITY EQUIPMENT (Sensor Type) | ALERT ID |
|---|---|---|---|
| | | | |

FIG. 6

APPARATUS AND METHOD FOR ANALYZING RULE-BASED SECURITY EVENT ASSOCIATION

RELATED APPLICATION(S)

This application claims the benefit of Korean Patent Application No. 10-2011-0136122, filed on Dec. 16, 2011, which is hereby incorporated by reference as if fully set forth herein.

FIELD OF THE INVENTION

The present invention relates to the association analysis of security events, and more particularly, to an apparatus for analyzing rule-based security event association and method that facilitate the association analysis of security events, transmitted between a physical security apparatus and an IT security apparatus, through user-based association analysis.

BACKGROUND OF THE INVENTION

Generally, conventional technology for the association analysis of security events is restrictively applied to only the area of IT security apparatuses, for example, a fire wall, an intrusion detection system, an intrusion prevention system, anti-virus system, etc., or a physical security apparatus such as an access control system, etc. is partially applied to the IT security apparatuses in level of the conventional technology.

Security events generated in the security apparatuses are collected, normalized, and stored in a database. Whether there is an external intrusion is determined through the association analysis of the security events stored in the database.

However, since the conventional technology stores security events in a database and then analyzes association between the security events, it is difficult to detect an external intrusion and respond to the detected intrusion in real time. Also, since the conventional technology performs the association analysis of security events based on an Internet protocol (IP) address, it is difficult to analyze association between an IP address-based IT security event and a user identifier (ID)-based physical security event.

SUMMARY OF THE INVENTION

In view of the above, the present invention provides an apparatus for analyzing rule-based security event association and method that facilitate the association analysis of security events, transmitted between a physical security apparatus and an IT security apparatus, through user-based association analysis.

Further, the present invention provides an apparatus for analyzing rule-based security event association and method that generate a user event memory and thus enables the prompt processing of the association analysis of security events transmitted between a physical security apparatus and an IT security apparatus.

In accordance with a first aspect of the present invention, there is provided an apparatus for analyzing rule-based security event association, the apparatus including: a rule management unit configured to check whether an security event is a candidate security event requiring association analysis; an event management unit configured to analyze the candidate security event and check whether the analyzed security event is the candidate security event requiring association analysis; and an association processing unit configured to analyze whether an association event of a rule DB corresponding to a user ID of the candidate security event is matched with a user event list to generate an association analysis result.

Preferably, the event management unit checks whether the candidate security event is matched with a plurality of analysis events included in a rule analysis event list, and determines the candidate security event as a security event requiring association analysis when there is an analysis event matched with the security event.

Preferably, the apparatus further includes a rule DB for storing the rule analysis event list.

Preferably, the rule management unit includes: a rule DB version check unit configured to check whether a version of the rule DB is changed; a rule DB analysis event collection unit configured to read the rule analysis event list from the rule DB; and an event filter unit configured to check whether the security event is an event corresponding to a rule analysis event, with a rule ID of the security event.

Preferably, the event management unit includes: an event memory generation unit configured to generate a user event memory for the security event; an event memory deletion unit configured to delete, when the security event is an event that requests deletion of an event memory for a corresponding user, the user event memory for the user; and an event memory management unit configured to manage, when the security event is received, an event memory for a corresponding user.

Preferably, the event memory management unit requests generation of an event memory for the new user from the event memory generation unit when the security event is an event of an unregistered new user.

Preferably, the association processing unit includes: a rule DB analysis event check unit configured to receive a rule ID and a user ID that correspond to the security event, and check a rule analysis event corresponding to the rule ID; a rule DB association event check unit configured to check whether the security event is matched with the rule analysis event; an event memory request unit configured to check, when the security event is matched with the rule analysis event, an association event corresponding to the user ID; an association check unit configured to analyze whether a user event list corresponding to the user ID is matched with the association event to perform association analysis; and a detection transfer unit configured to receive an association analysis result from the association check unit to supply the association analysis result to the user.

Preferably, the rule DB analysis event check unit transmits a corresponding user ID of the security event to the user event memory request unit when the security event is matched with the rule analysis event, and transmits a matched rule ID to the rule DB association event check unit.

Preferably, the rule DB association event check unit requests a corresponding user event list of the security event from the event management unit, and receives the user event list to supply the user event list to the association check unit.

In accordance with a second aspect of the present invention, there is provided method for analyzing rule-based security event association, the method including: checking whether a security event is a candidate security event requiring association analysis; checking whether the candidate security event is matched with a rule analysis event; checking, when the candidate security event is matched with the rule analysis event, an association event corresponding to a corresponding user ID of the security event; checking, when the candidate security event is matched with the rule analysis event, a user event list of a corresponding user of the security event; and analyzing whether the association event is matched with the user event list to output an association analysis result.

Preferably, the checking whether the security event is a candidate security event requiring association analysis includes: checking whether the security event is matched with a plurality of analysis events included in a rule analysis event list; and determining, when there is an analysis event matched with the security event, the security event as a candidate security event requiring association analysis.

Preferably, the checking the association event includes transmitting the user ID to a user event memory request unit to check an association event linked to the user ID.

Preferably, the checking the user event list includes transmitting a rule ID of the security event to a rule DB association event check unit to check a corresponding user event list of the matched security event.

BRIEF DESCRIPTION OF THE DRAWINGS

The above and other objects and features of the present invention will become apparent from the following description of embodiments given in conjunction with the accompanying drawings, in which:

FIGS. 2A and 2B are an exemplary diagram showing normalization field values generated respective security apparatuses in accordance with an embodiment of the present invention;

DETAILED DESCRIPTION OF THE EMBODIMENTS

Hereinafter, embodiments of the present invention will be described in detail with reference to the accompanying drawings so that they can be readily implemented by those skilled in the art.

Figure 1:
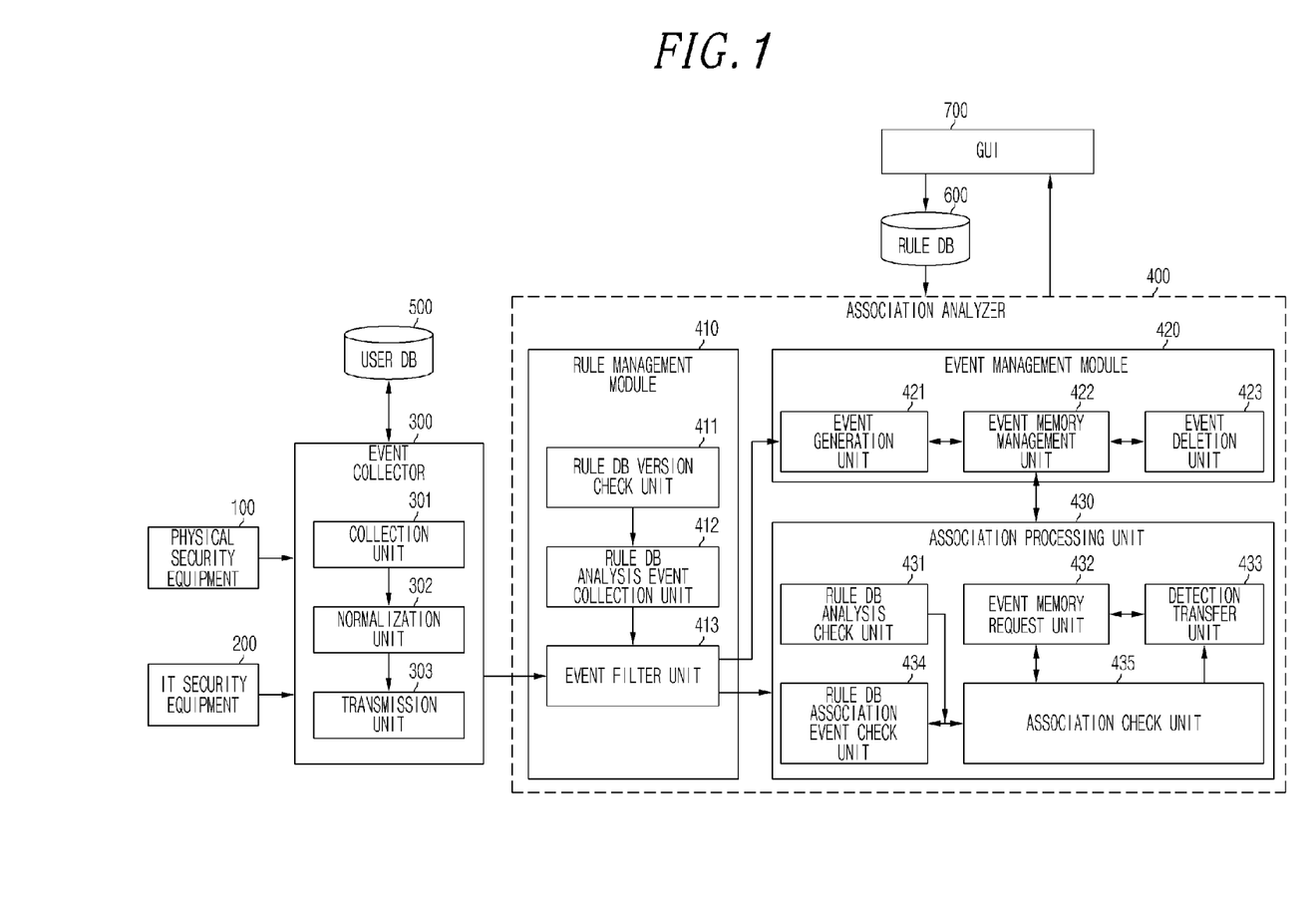
FIG. 1 illustrates a block diagram of an apparatus for analyzing rule-based security event association in accordance with an embodiment of the present invention.

FIG. 1 illustrates a block diagram of an apparatus for analyzing rule-based security event association in accordance with an embodiment of the present invention.

Referring to FIG. 1, the apparatus for analyzing rule-based security event association includes a physical security equipment 100, an IT security equipment 200, an event collector 300, an association analyzer 400, a user DB 500, a rule DB 600, and a GUI 700.

The physical security equipment 100 and the IT security equipment 200 generate security events.

The event collector 300 collects the security events from the physical security equipment 100 and the IT security equipment 200, and normalizes the collected security events. The normalized security events are supplied to the association analyzer 400.

The association analyzer 400 analyzes association between the security events received from the event collector 300.

The user DB 500 stores information necessary for performing the normalization and, in response to a request, the user DB 500 supplies the information necessary for the normalization to the event collector 300.

The rule DB 600 stores rules necessary for performing association analysis by the association analyzer 400, and, in response to a request, the rule DB 400 supplies information on the rules to the association analyzer 400. The GUI 700 shows a result of detection that has been performed by the association analyzer 400.

More specifically, the event collector 300 includes a collection unit 301, a normalization unit 302, and a transmission unit 303. The collection unit 301 collects security events generated by the physical security equipment 100 and the IT security equipment 200. The normalization unit 302 normalizes the security events, generated by the security equipments 100 and 200, with reference to a user information table and system asset table of the user DB 500.

Figure 2A:
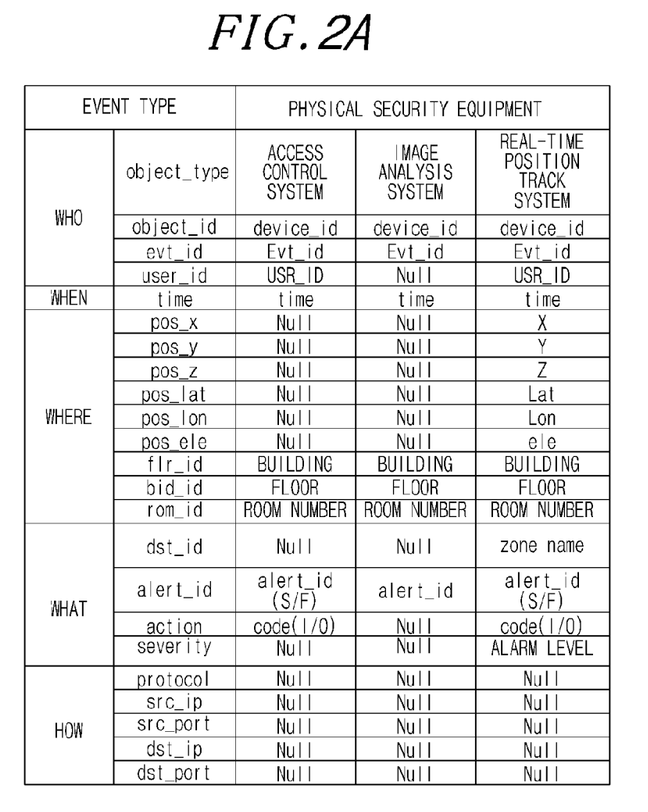
Figure 3:
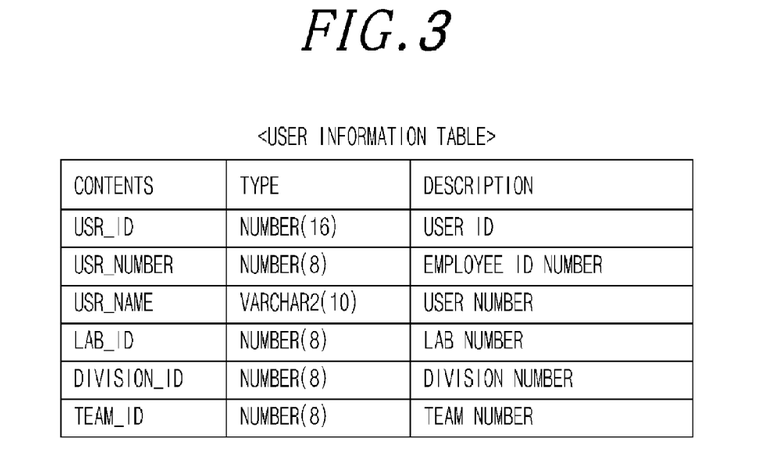
FIG. 3 is an exemplary diagram showing a user information table of a user database (DB) in accordance with an embodiment of the present invention.
Figure 4:
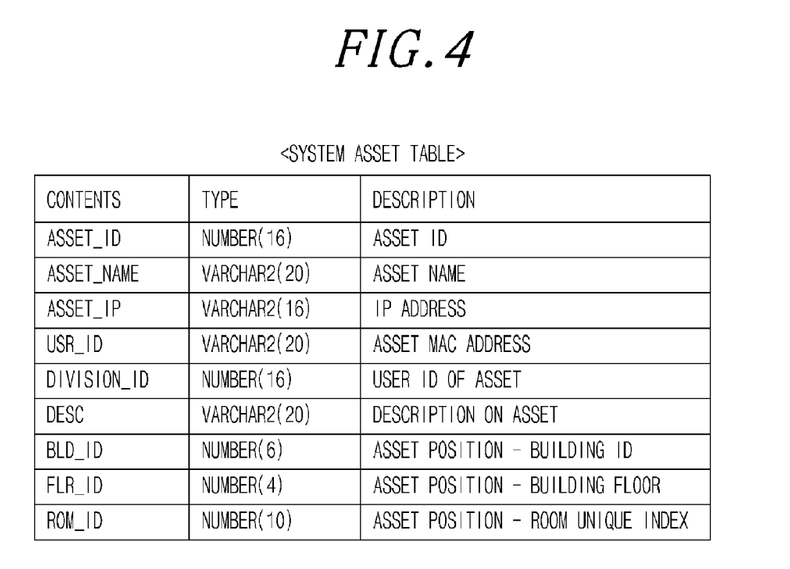
FIG. 4 is an exemplary diagram showing a system asset table of a user DB in accordance with an embodiment of the present invention.

FIGS. 2A and 2B show normalization field values generated at respective physical and IT security equipments in accordance with an embodiment of the present invention; FIG. 3 shows the user information table of the user DB 500 in accordance with an embodiment of the present invention; and FIG. 4 shows the system asset table of the user DB 500 in accordance with an embodiment of the present invention.

The normalization unit 302 makes reference the user DB table to fill a user ID "user id" of a WHO area and a WHERE area in normalization fields by using an IP address of a security event generated by the IT security equipment 200, and fills the other area with fields of the security event. Also, the normalization unit 302 makes reference to the user DB table to fill a WHERE area in normalization fields by using an IP address of a security event generated by the physical security equipment 200, and fills the other area with fields of the security event. The events normalized by the normalization unit 302 are transferred to the association analyzer 400 through the transmission unit 303. The association analyzer 400 includes a rule management module 410, an event management module 420, and an association processing module 430.

The rule management module 410 includes a rule DB version check unit 411, a rule DB analysis event collection unit 412, and an event filter unit 413. The rule management module 410 selectively supplies security events, supplied from the event collector 300, to the event management module 420 or the association processing module 430. In detail, when an event is a candidate to be subjected to a rule analysis, the rule management module 410 supplies the candidate event to the association processing module 430 for performing association analysis. However, when the corresponding event is not subjected to the rule analysis event, the rule management module 410 supplies the corresponding event to the event management module 420 for storing it.

During the association analyzer 400 is driven, the rule DB version check unit 411 determines whether a version of the rule DB 600 is changed. When it is determined that the version of the rule DB 600 has been changed, the rule DB analysis event collection unit 412 reads a rule analysis event list from a rule analysis event table in the rule DB 600, and supplies the rule analysis event list to the event filter unit 413.

Figure 5:
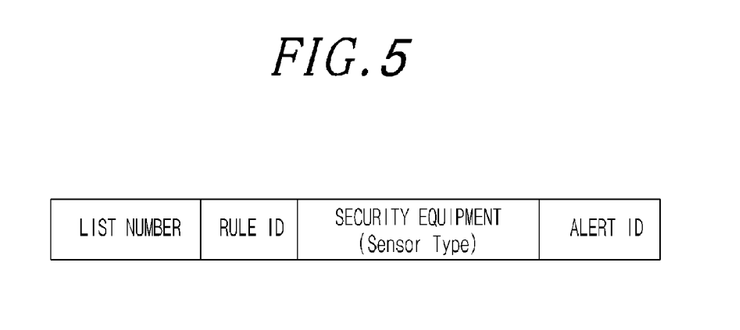
FIG. 5 is an exemplary diagram showing a data structure of an analysis event list of a rule DB in accordance with an embodiment of the present invention.

The event filter unit 413 determines whether the candidate event transferred from the event collector 300 is included in a rule analysis event table, "ALERT ID of RULESET_SRCEVT TABLE", with an information ID of the transferred event. When it is determined that the candidate event is included in the rule analysis event table, the event filter unit 413 supplies the candidate event to the association processing module 430 for performing association analysis. However, when the candidate event is not included in the rule analysis event table, the event filter unit 413 supplies the candidate event to the event management module 420 for storing the candidate event, so that the analysis event list of the rule DB 600 is stored in a structure of FIG. 5 in a memory.

The rule DB 600 adds rules therein, deletes rules stored therein, or changes rules stored therein through the GUI 700. The GUI 700 related to the rule DB 600 is as shown in FIG. 6.

Figure 6:
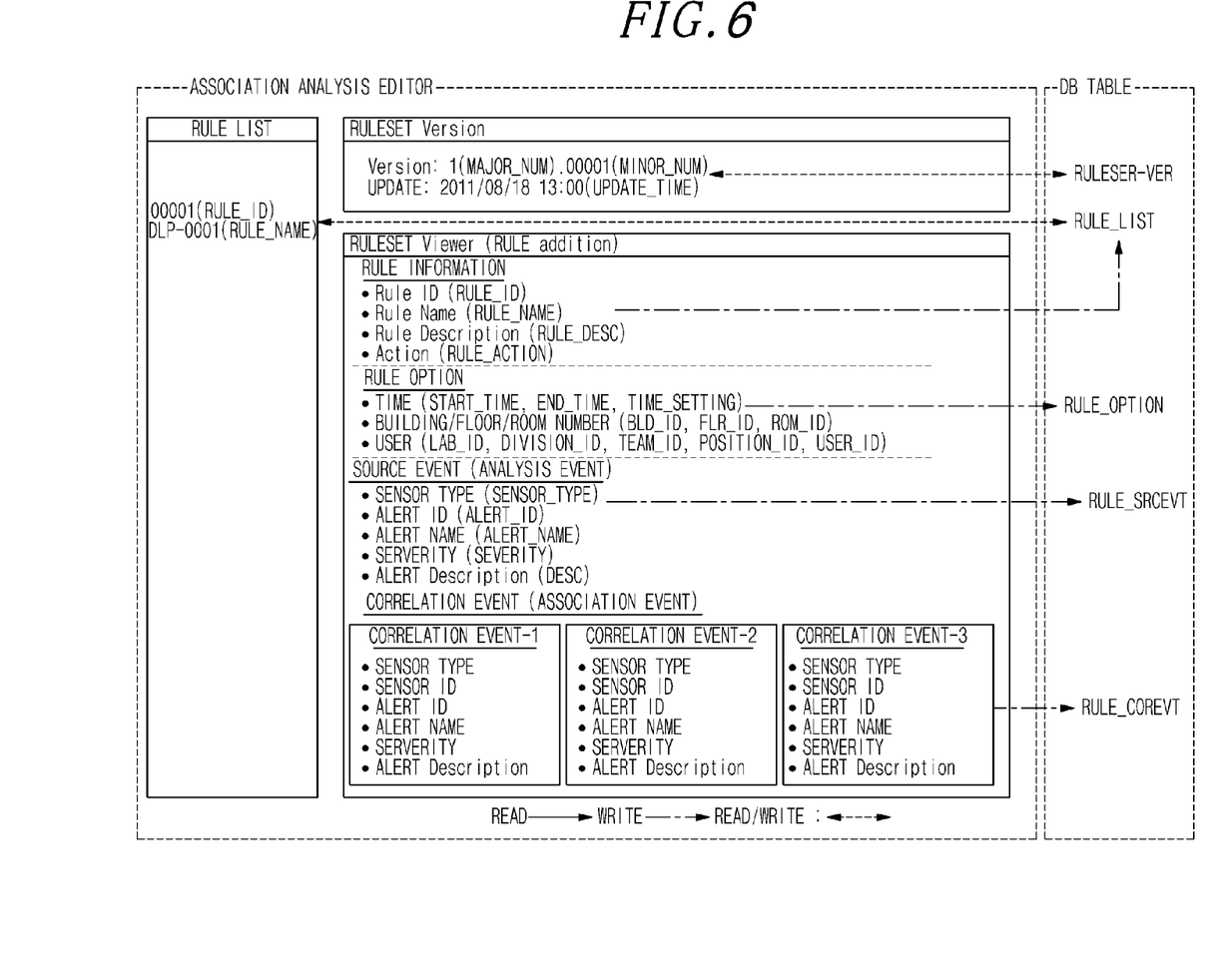
FIG. 6 is an exemplary diagram showing a graphical user interface (GUI) screen related to a rule DB in accordance with an embodiment of the present invention.

Referring to FIG. 6, the rule DB 600 is configured with five tables "RULESET_VER, RULE_LIST, RULE_OPTION, RULE_SRCEVT, and RULE_COREVT". Fields of the respective tables have the following configurations.

RULESET_VER: Version information table of rule DB

RULESET_LIST: Rule set list table

RULESET_LIST: Rule option including time, space, and user

RULESET_SRCEVT: Rule analysis event list table

RULESET_COREVT: Rule-related event list table

| <RULESET_VER> | | |
|---|---|---|
| Contents | Type | Description |
| MAJOR_NUM | NUMBER(5) | Version Major Number |
| MINOR_NUM | NUMBER(5) | Version Minor Number |
| UPDATE_TIME | DATE | Update Time |

| <RULESET_LIST> | | |
|---|---|---|
| Contents | Type | Description |
| RULE_ID | NUMBER(5) | Rule ID AUTO INCREMENT |
| RULE_NAME | VARCHAR2(20) | Rule Name |
| RULE_DESC | VARCHAR2(500) | Rule Description |
| RULE_ACTION | NUMBER(1) | 0: Log 1: Alert 2: Response |

| <RULESET_OPTION> | | |
|---|---|---|
| Contents | Type | Description |
| RULE_ID | NUMBER(5) | Rule ID |
| START_TIME | DATE | Application Start Time |
| END_TIEM | DATE | Application Release Time |
| TIME_SETTING | NUMBER(1) | 0: DISABLE, 1: ENABLE |
| BLD_ID | NUMBER(6) | Building ID |
| FLR_ID | NUMBER(4) | Building Floor |
| ROM_ID | NUMBER(10) | Room Unique Index |
| LAB_ID | NUMBER(8) | LAB Number |
| DIVISION_ID | NUMBER(8) | Division Number |
| TEAM_ID | NUMBER(8) | Team Number |
| POSITION | NUMBER(1) | Position Division Numbers (0: full-time employee, 1: contract employee, 3: service employee) |
| USR_ID | NUMBER(16) | User ID |

| <RULESET_SRCEVT> | | |
|---|---|---|
| Contents | Type | Description |
| RULE_ID | NUMBER(5) | Rule ID |
| SENSOR_TYPE | NUMBER(2) | System Sensor Type (01: AC, 02: VA, 03: RTLS, 04: DAM, 05: DLP06: VPN, 07: ESM, 08: FW, 12: IPS) Agent Sensor Type (11: HAC, 12: HAV, 13: HFW,) |
| ALERT_ID | NUMBER(5) | Alarm ID |

| <RULESET_COREVT> | | |
|---|---|---|
| Contents | Type | Description |
| RULE_ID | NUMBER(5) | Rule ID |
| SENSOR_TYPE | NUMBER(2) | System Sensor Type (01: AC, 02: VA, 03: RTLS, 04: DAM, 05: DLP06: VPN, 07: ESM, 08: FW, 12: IPS) Agent Sensor Type (11: HAC, 12: HAV, 13: HFW,) |
| ALERT_ID | NUMBER(5) | Alarm ID |
| CONDITION | NUMBER(1) | 0: Selective Condition, 1: Essential Condition |

The event management module 420 includes an event deletion unit 423, an event memory management unit 422, and an event generation unit 421. The event management module 420 deletes or generates a user event transferred from the rule management module 410, and supplies the user event to the association processing module 430 for performing association analysis.

When a new user event that is not present is generated, the event memory management unit 422 requests the generation of a user event memory from the event generation unit 421. Also, when an event is received from a user, for example, an event that a user goes out through an access control system, the event memory management unit 422 requests the deletion of an event memory corresponding to the user from the event deletion unit 423. Further, the event management module 420 manages the event memories on a user basis, and thus, when the association processing module 430 requests an event list of a specific user, the event management module 420 transfers an event memory for the specific user to the association processing module 430.

Figure 7:
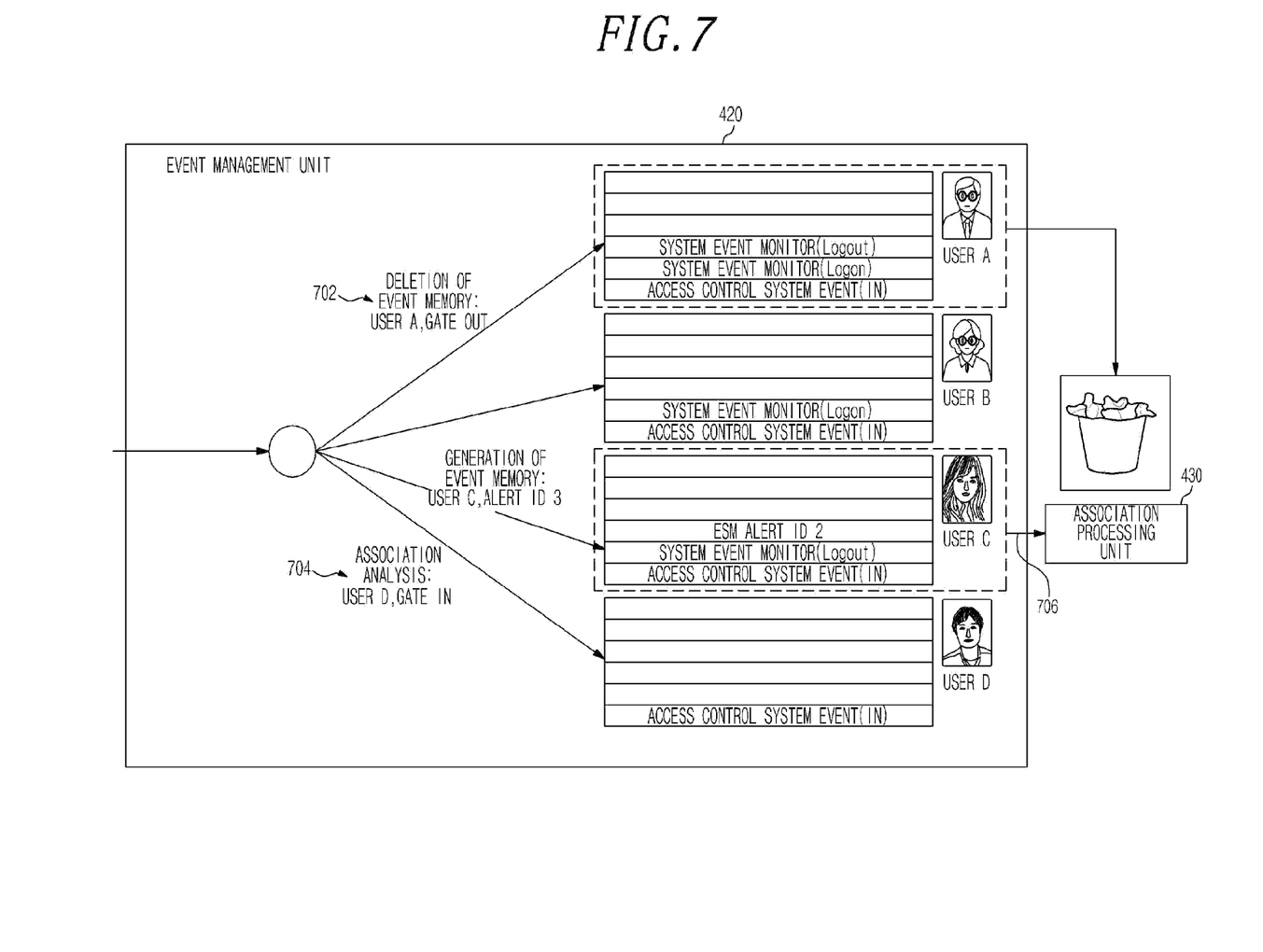
FIG. 7 is a conceptual diagram illustrating an operation performed in an event management unit and an association processing unit shown in FIG. 1.

FIG. 7 is a conceptual diagram illustrating an operation performed in an event management unit and an association processing unit shown in FIG. 1.

When a security event is received from the rule management module 410 in operation S700, the event management module 420 analyzes the security event to delete or generate an event memory related to the security event or perform association analysis.

For example, as illustrated in operation 702, when the event management module 420 receives a security event that a user A with an event memory managed by the event memory management unit 422 goes out through an access control system, the event management module 420 deletes the event memory of the user A, from the memory unit.

Further, as illustrated in operation 704, when a new security event related to a user D, which is not present, is received, the event management module 420 generates a new event memory for the user D.

Moreover, as illustrated in operation 706, when a security event is a candidate event to be subjected to the association analysis, the event management module 420 transmits an event list, related to a user C registered in the event memory management unit 422, to the association processing module 430.

The association processing module 430 includes a rule DB analysis event check unit 431, a rule DB association event check unit 434, an event memory request unit 432, an association check unit 435, and a detection transfer unit 433. The association processing module 430 analyzes whether a user event list is matched with an association event of the rule DB 600, thereby generating an association analysis result.

The rule DB analysis event check unit 431 receives a user ID corresponding to a rule ID which corresponds to the candidate security event transferred from the rule management module 410, and reads a rule DB analysis event for the rule ID, from the rule DB 600. The rule DB analysis event check unit 431 determines whether the read rule DB analysis event is matched with the received candidate security event. When the read rule DB analysis event is matched with the candidate security event, the rule DB analysis event check unit 431 transfers the rule ID to the rule DB association event check unit 434, and reads a relevant association event list from the rule DB 600. Also, the rule DB association event check unit 434 transfers the matched candidate security event to the event memory request unit 432.

The association check unit 435 determines whether a association security event is matched with a rule DB association event. When it is determined that the association security event is matched with the rule DB association event, the association check unit 435 transfers the determined result to the GUI 700.

Figure 8:
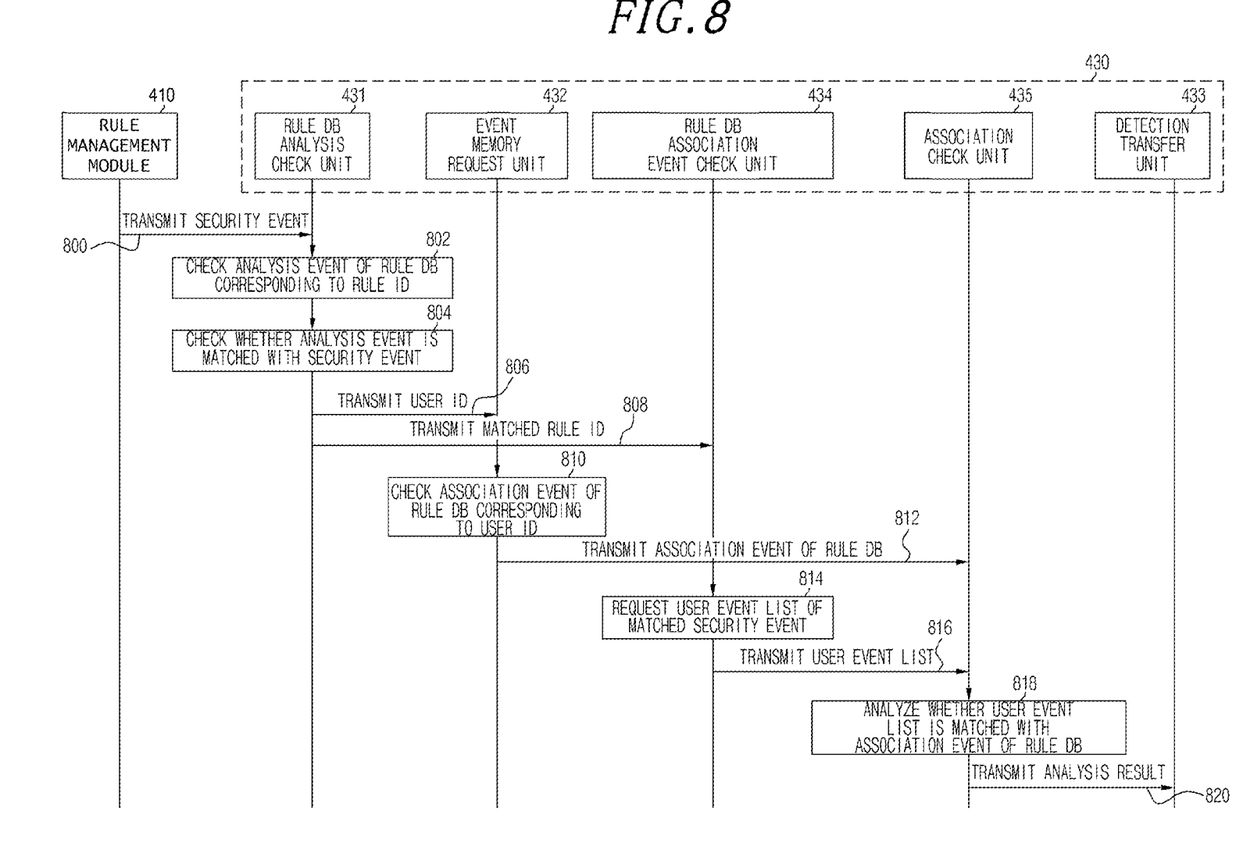
FIG. 8 is a flowchart illustrating a process for analyzing association between rule-based security events performed by the association processing unit shown in FIG. 1.

FIG. 8 is a flowchart illustrating a process for analyzing association between rule-based security events performed by the association processing unit shown in FIG. 1.

When a security event is received from the event collector 300, the rule management module 410 transmits a candidate security event to the rule DB analysis event check unit 431 of the association processing module 430, in operation 800. Along with the security event, a rule ID and a user ID which correspond to the security event are also transmitted to the rule DB analysis event check unit 431.

Then, the rule DB analysis event check unit 431 reads a rule DB analysis event, corresponding to the rule ID, from the rule DB 600 in operation 802, and determines whether the rule DB analysis event is matched with the candidate security event in operation 804.

When the analysis event is matched with the candidate security event as the determined result, the rule DB analysis event check unit 431 transmits the user ID to the event memory request unit 432 in operation 806, and transmits the matched rule ID to the rule DB association event check unit 434 in operation 808.

Subsequently, the event memory request unit 432 checks an association event of the rule DB corresponding to the user ID in operation 810, and transmits the checked association event of the rule DB to the association check unit 435 in operation 812.

The rule DB association event check unit 434 receives the matched rule ID from the rule DB analysis event check unit 431, requests an event list of a user, corresponding to the matched security event, from the event management module 420 to receive the event list from the event management module 420 in operation 814, and transmits the received user event list to the association check unit 435 in operation 816.

The association check unit 435 analyzes whether the user event list is matched with the association event of the rule DB in operation 818, and transmits the analyzed association result to the detection transfer unit 433 in operation 820. The detection transfer unit 433 displays the analyzed association result through the GUI 700, thereby enabling the user to check the analyzed result.

As described above, in a method of performing the association analysis of a security event transmitted from the physical/IT security equipment, the present invention does not perform the association analysis of security events in a type in which the security events are stored in a database but generates a user event memory to perform the association analysis, thus enabling prompt detection and facilitating association analysis between the physical security equipment and the IT security equipment through user-based association analysis.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An apparatus for analyzing rule-based security event association, the apparatus comprising:
    a memory unit;
    a first manager configured to check whether a security event is a candidate security event requiring association analysis;
    a second manager configured to:
        determine whether the security event is a user event associated with a user,
        when the user event is a new user event associated with an ingress, create an event list associated with the user in the memory unit and create an entry for the user event in the event list,
        when the user event is a departing user event associated with a departure, delete the event list associated with the user from the memory unit,
        when the user event is one of a logon event, a logoff event, and an alert event, create an entry for the user event in the event list associated with the user, and
        provide a user event list of a requested user; and
    a processor configured to analyze whether an association event of a rule DB corresponding to a user ID of the candidate security event is matched with the user event list to generate an association analysis result.

2. The apparatus of claim 1, wherein the first manager is configured to check whether the security event is matched with one of analysis events included in a rule analysis event list, and to determine the candidate security event as a security event requiring association analysis when there is an analysis event matched with the security event.

3. The apparatus of claim 2, further including a rule DB for storing the rule analysis event list.

4. The apparatus of claim 3, wherein the first manager comprises:
    a rule DB version check unit configured to check whether a version of the rule DB is changed;
    a rule DB analysis event collection unit configured to read the rule analysis event list from the rule DB; and
    an event filter unit configured to check whether the security event is an event corresponding to a rule analysis event, with a rule ID of the security event.

5. The apparatus of claim 3, wherein the processor comprises:
    a rule DB analysis event check unit configured to receive a rule ID and a user ID that correspond to the security event, check a rule analysis event corresponding to the rule ID, and check whether the candidate security event is matched with the rule analysis event;

an event memory request unit configured to check, when the security event is matched with the rule analysis event, an association event corresponding to the user ID;

an association check unit configured to analyze whether the user event list is matched with the association event to perform association analysis; and a detection transfer unit configured to receive an association analysis result from the association check unit and display the association analysis result through a user interface.

6. The apparatus of claim 5, wherein the rule DB analysis event check unit is configured to transmit the user ID to the second manager when the security event is matched with the rule analysis event, and transmits the rule ID to the rule DB association event check unit, wherein the user ID indicates the requested user.

7. The apparatus of claim 5, wherein the rule DB association event check unit is configured to request the user event list of the requested user associated with the security event from the second manager, and receives the user event list to supply the user event list to the association check unit.

8. The apparatus of claim 1, further including physical security equipment configured to generate the new user event when an ingress of the user through an access control system occurs.

9. The apparatus of claim 1, further including physical security equipment configured to generate the departing user event when a departure of the user through an access control system occurs.

10. A method for analyzing rule-based security event association, the method comprising:

checking whether a security event is a candidate security event requiring association analysis;

checking whether the candidate security event is matched with a rule analysis event;

checking, when the candidate security event is matched with the rule analysis event, an association event corresponding to a corresponding user ID of the security event;

determining whether the security event is a user event associated with a corresponding user of the user event;

when the user event is a new user event associated with an ingress, creating in a memory unit an event list associated with the corresponding user of the user event and creating an entry for the user event in the event list;

when the user event is a departing user event associated with a departure, deleting from the memory unit the event list associated with the corresponding user of the user event;

when the user event is one of a logon event, a logoff event, and an alert event, creating an entry for the user event in the event list associated with the corresponding user of the user event;

checking, when the candidate security event is matched with the rule analysis event, an event list associated with a corresponding user of the candidate security event; and analyzing whether the association event is matched with the event list associated with a corresponding user of the candidate security event to output an association analysis result.

11. The method of claim 10, wherein said checking whether the security event is a candidate security event requiring association analysis comprises:

checking whether the security event is matched with one of analysis events included in a rule analysis event list; and determining, when there is an analysis event matched with the security event, the security event as a candidate security event requiring association analysis.

12. The method of claim 10, wherein said checking the association event comprises transmitting the user ID to a user event memory request unit to check an association event linked to the user ID.

13. The method of claim 10, wherein said checking the user event list comprises transmitting a rule ID of the security event to a rule DB association event check unit to check a corresponding user event list of the matched security event.

14. The method of claim 10, further including generating the new user event when an ingress of the corresponding user through an access control system occurs.

15. The method of claim 10, further including generating the departing user event when a departure of the corresponding user through an access control system occurs.

* * * * *